Sept. 1, 1931.   W. G. WILSON   1,821,867
JOINT STRUCTURE FOR PIPES AND THE LIKE
Filed Feb. 28, 1930   2 Sheets-Sheet 1

INVENTOR
Wylie G. Wilson
BY
his ATTORNEY

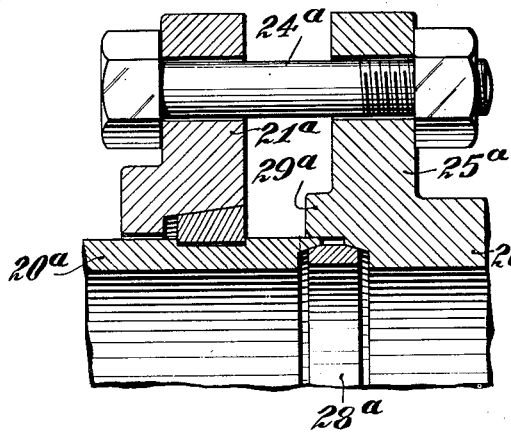
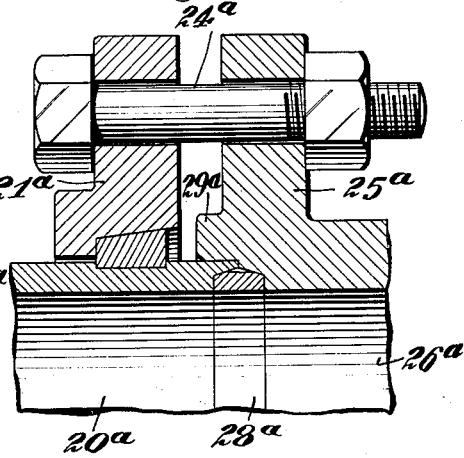
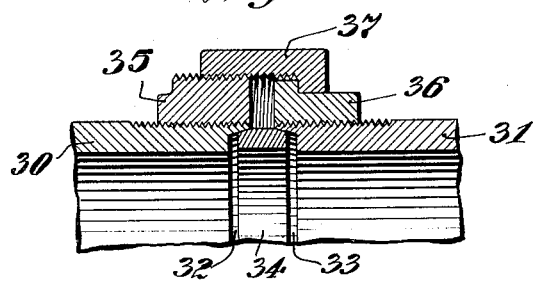
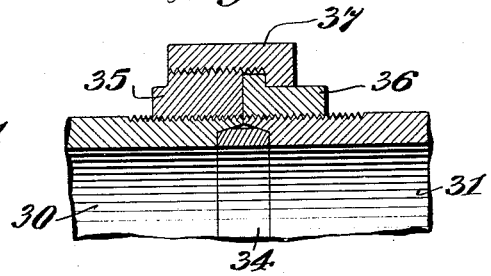
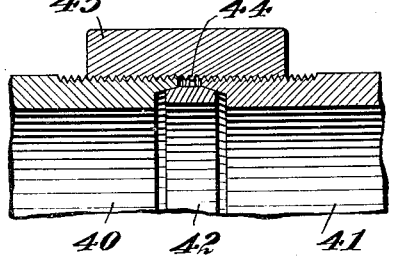
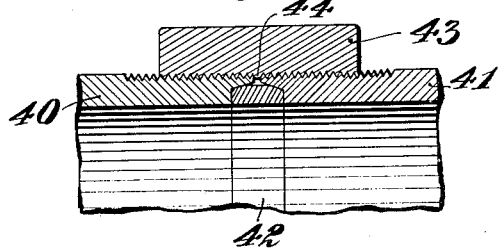

Patented Sept. 1, 1931

1,821,867

UNITED STATES PATENT OFFICE

WYLIE G. WILSON, OF ELIZABETH, NEW JERSEY

JOINT STRUCTURE FOR PIPES AND THE LIKE

Application filed February 28, 1930. Serial No. 432,007.

This invention relates to joints and is particularly applicable to the joining of pipes or conduits. Accordingly, the invention will be discussed and disclosed as applied to pipes; but some features of the invention are applicable to other purposes, e. g. the joining of shafts, or the like.

In the prior art many types of joints have been proposed, but considerable difficulty has been experienced in making a satisfactory commercial joint for pipes of large size, particularly where the joint is to be subjected to high pipe line pressures. In general, prior art joints designed for large sizes of pipe and/or for high pipe line pressures are expensive to manufacture, and their manufacture usually involves heating of the pipe ends which is detrimental. Also such prior art joints require considerable care and skill in installation.

The general object of the present invention is to provide an inexpensive, reliable commercial joint adapted for large sizes of pipe and/or for pipe of any size which is to carry high pressures.

Another object of the invention is to provide a simple inexpensive means for securing an apertured fitting to a cylindrical body such as a pipe.

Another object of the invention is to provide a fluid tight joint which can be readily broken and remade.

A further object of the invention is to provide a high pressure joint which can be satisfactorily installed by workers who are neither specially skilled nor required to exercise special care.

Fig. 6 is a fragmentary sectional view showing a slightly modified form of the invention as applied to the joining of a pipe end to a valve fitting, elbow fitting, or the like. The parts are shown as assembled preparatory to making the joint.

Fig. 7 is a fragmentary sectional view showing the joint completed from the assembly of Fig. 6.

Fig. 8 is a fragmentary sectional view showing a form of the invention utilizing threaded fittings similar in some respects to those used in pipe unions. The parts are shown as assembled preparatory to making the joint.

Fig. 9 is a fragmentary sectional view showing the joint completed from the assembly of Fig. 8.

Fig. 10 is a fragmentary sectional view showing a form of the invention utilizing a threaded sleeve. The parts are shown as assembled preparatory to making the joint.

Fig. 11 is a fragmentary sectional view showing the joint completed from the assembly of Fig. 10.

Figure 1:
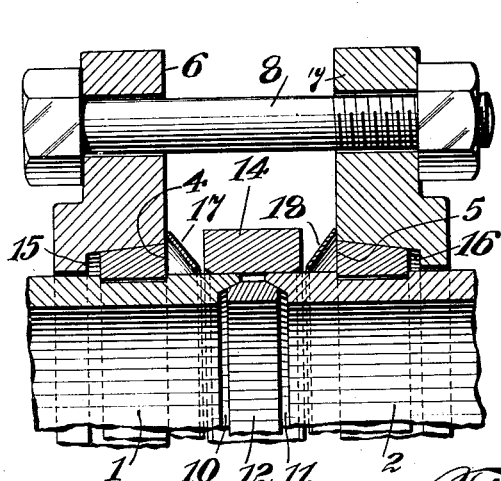
Fig. 1 is a fragmentary sectional view showing one form of the invention as applied to the joining of two sections of pipe. The parts are shown as assembled preparatory to making the joint.
Figure 2:
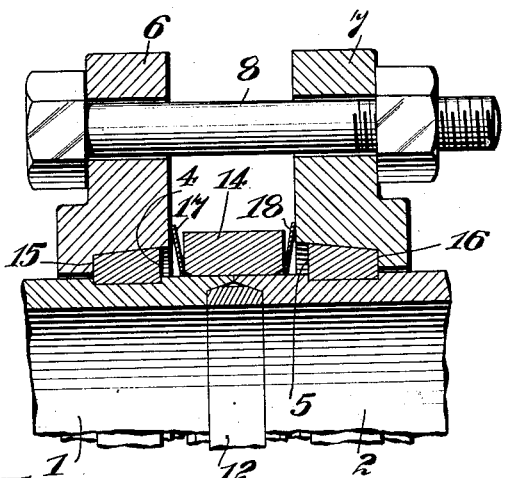
Fig. 2 is a fragmentary sectional view showing the joint completed from the assembly of Fig. 1.
Figure 3:
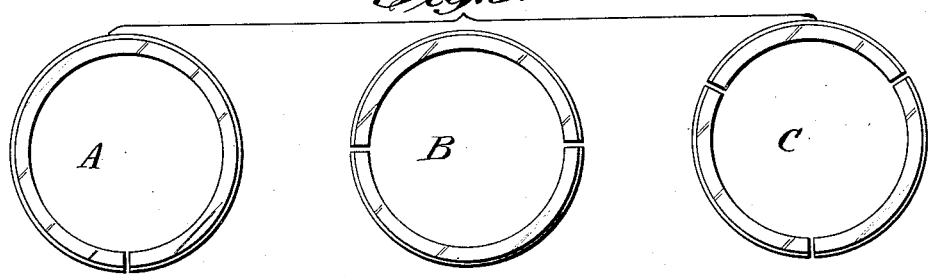
Fig. 3 shows in elevation three types of holding rings, which may be used in joints embodying the present invention.

Reference will now be had to Figs. 1 and 2. Machined near the ends of pipe sections 1 and 2 are grooves of a width sufficient to receive holding rings 4 and 5. These grooves may be of a depth equal to the depth of standard pipe threads for the size of pipe in which they are machined. To provide for assembly the rings 4 and 5 are either split as shown at A in Fig. 3 or are made in several parts as shown at B and C in Fig. 3. After the holding rings 4 and 5 have been put in place on the pipe there are telescoped over them flanges 6 and 7 having tapered annular surfaces complementary to the tapered surfaces on the exterior of the rings 4 and 5.

The ends of the pipe are provided with annular recesses having annular tapered side walls 10 and 11, which may be conical in form, and which are adapted to engage complementary tapered surfaces on a sealing ring 12. The sealing ring 12 is preferably made of resilient metal similar in character to the metal of the pipe. The material of the ring and its proportions are such that upon being constricted with sufficient force, it contracts circumferentially as a unit. In its normal state (i. e. unconstricted) the interior diameter of the ring 12 is preferably somewhat larger than the interior diameter of the pipe.

The parts are assembled as shown in Fig. 1, the annular pipe walls 10 and 11 starting to telescope over the complementary tapered surfaces of the sealing ring 12, and the pipe ends being telescoped within an abutment ring 14. After the parts have been assembled, the flanges 6 and 7 are drawn toward one another by suitable means such as bolts 8 (one shown). The movement of the flanges contracts holding rings 4 and 5, and preferably the parts are so proportioned that the holding rings 4 and 5 will have taken merely a fairly tight grip on the pipe by the time annular lips 15 and 16 of the flanges strike the ends of the rings 4 and 5. It will be seen that the lps 15 and 16 place a definie limit upon the longitudinal motion of the flanges relative to the holding rings 4 and 5. If the parts be proportioned as just described, this limit will be reached without rings 4 and 5 being subjected to a constricting pressure sufficiently high to cause contraction of the pipe, but the rings 4 and 5 will, nevertheless, take a firm grip on the pipe. Preferably, the taper on the outer surfaces of the rings 4 and 5 is slow tapering so that the flanges will take a seize grip upon the rings 4 and 5, and thus become in effect permanently locked to the pipe.

As the bolts 8 are tightened, the pipe ends move towards one another, and the motion of the pipe ends may or may not commence before the lips 15 and 16 strike the ends of holding rings 4 and 5. The movement of the pipe ends causes high pressure to be exerted between the tapered sealing walls 10 and 11 of the pipe ends and the complementary tapered sealing surfaces on the sealing ring 12. This pressure continues to be exerted as the walls 10 and 11 slide over the surfaces of the ring 12, and this sliding of the surfaces under high pressure causes local action on the metal of the sliding surfaces which action is in effect a local cold working. This sliding action so removes machining irregularities as to produce a sealing fit capable of withstanding high pipe line pressure and, for convenience, the action by which the sealing fit is produced will be referred to as a lapping action. Preferably, the metal of the ring is resilient and this resiliency insures the maintaining of the sealing pressure even under expansion and contraction of the parts due to temperature changes.

When I say the sealing ring is contracted as a unit, I mean that the ring is contracted throughout its entire length, measured axially of the pipe. In fact, in actual practice, with a sealing ring of the proportion shown in the drawings, the geometrical configuration of the ring's cross section (as taken in the drawings) is maintained insofar as the eye can detect, but the entire circumference of the ring is reduced. In such a case, the geometrical change in the ring in actual practice is similar in kind (not necessarily degree) to the geometrical change caused by a decrease in temperature of the ring.

In the finished joint, the pipe is preferably in contact with the ends of sealing ring 12 as shown in Fig. 2, and the sealing ring 12 has preferably been so contracted that its interior surface is flush with the interior surface of the pipe. The flanges 6 and 7 and the bolts 8 form a rigid mechanical connection between the two sections of pipe so that any bending stresses which may be put upon the pipe are resisted at the joint by the bolted flanges and hence such stresses cannot impair the seal. The interior of the ring being flush with the interior of the pipe no crevices are left to induce eddy currents and impede the flow through the pipe. Also, there is no place for residue or other material to lodge at the joint.

The abutment ring 14 will ordinarily be made of metal similar in character to the metal of the pipe, e. g. a steel abutment ring for steel pipe and a brass abutment ring for brass pipe. This ring is preferably centered with respect to the two sections of pipe and this can be conveniently brought about by providing conical spacer rings 17 and 18 made of thin metal. These spacer rings fit loosely on the pipe and merely act to center abutment ring 14 as the joint is drawn up. As the joint is drawn up the spacer rings 17 and 18 are deformed, but preferably they are so sized that they do not make a gripping contact with the pipe.

The abutment ring 14 is virtually non-expansible and thus it prevents any appreciable expansion of the tips of pipe ends 1 and 2. Usually, however, the contraction of the sealing ring 12 will result in expanding the pipe ends into reasonably tight fit with the abutment ring 14. Thus, as the joint is completed, the exterior surfaces of the pipe will slide under pressure over the interior surface of ring 14, thereby lapping the sliding surfaces into sealing fit. Thus, there are two seals, one made by ring 12 and the other by ring 14. The lapping of the pipe ends into sealing fit with rings 12 and 14 is improved by suitably lubricating (e. g. with oil or grease) the surfaces to be lapped. The lubrication minimizes the tendency of the contacting surfaces to seize and tear, and it also makes it easier to draw up the joint. Preferably, the bore of the abutment ring is chamfered at its ends as shown to facilitate remaking of the joint when it is broken for cleaning the pipe or replacement of a pipe section.

Figure 4:
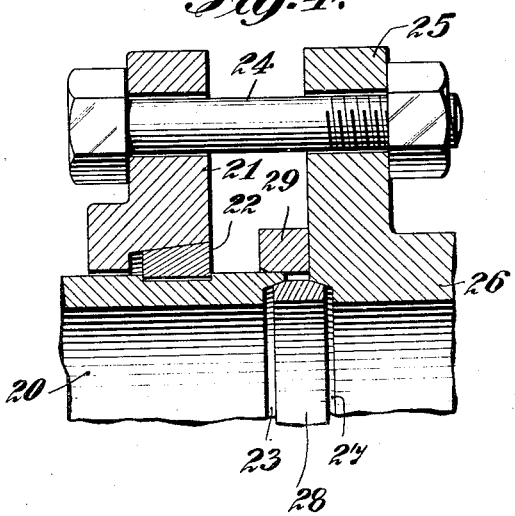
Fig. 4 is a fragmentary sectional view showing one form of the invention as applied to joining a pipe end to a valve, elbow fitting, or the like. The parts are shown as assembled preparatory to making the joint.
Figure 5:
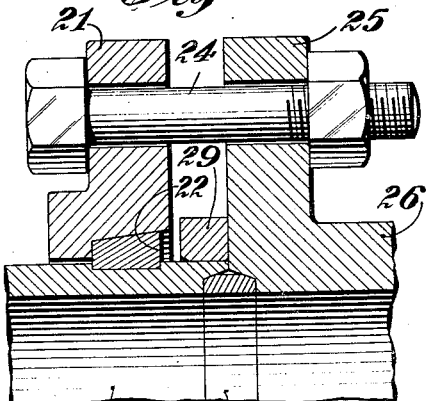
Fig. 5 is a fragmentary sectional view showing the joint completed from the assembly of Fig. 4.

Reference will now be had to Figs. 4 and 5. A pipe end 20 is provided with a flange 21, a holding ring 22 and a recess providing an annular sealing wall 23, all arranged in the same manner as corresponding parts in Fig. 1. Flange 21 is adapted to be secured by means of bolts 24 (one shown) to a flange 25 of a valve fitting, elbow, or the like, 26. The fitting 26 is recessed as shown to provide a tapered annular sealing wall 27 adapted to engage a complementary sealing surface of a contractable sealing ring 28. The parts are initially assembled as shown in Fig. 4, the tip of the pipe 20 being nested within an abutment ring 29 adapted to prevent expansion of the end of the pipe 20. After the parts have been assembled as shown in Fig. 4, the flanges 21 and 25 are drawn toward one another by means of bolts 24 (one shown), thus forming a joint as shown in Fig. 5. The flange 21 becomes secured to the pipe 20 by holding ring 22 as previously explained in connection with Figs. 1 and 2, and the sealing ring 28 is contracted as a unit, forming a seal as explained in Figs. 1 and 2.

The form of the invention shown in Figs. 6 and 7 differs from that shown in Figs. 4 and 5 in only one respect, viz., separate abutment ring 29 (Figs. 4 and 5) is replaced by an abutment ring 29ª (Figs. 6 and 7) that is integral with fitting 26ª. The parts are initially assembled as shown in Fig. 6 and then the flanges 21ª and 25ª are drawn towards one another by means of bolts 24ª (one shown) thus forming a joint as shown in Fig. 7.

Reference will now be had to Figs. 8 and 9. Pipe ends 30 and 31 are recessed to provide annular sealing walls 32 and 33 adapted to cooperate with complementary sealing surfaces of a sealing ring 34 similar to the sealing rings previously described. Threaded to the ends of the pipe sections 30 and 31 are union type fittings 35 and 36 adapted to be drawn together by the usual nut 37. The parts are initially assembled as shown in Fig. 8 and then the nut 37 is tightened up, thus drawing the pipe ends together and contracting the sealing ring 34 to form a joint as shown in Fig. 9. The fittings 35 and 36 so reenforce the tips of the pipe as to prevent their expansion by the pressure exerted by sealing rings 34. It will be seen that these threaded fittings 35 and 36 in themselves constitute abutment means surrounding the ends of the pipe to prevent expansion of the pipe ends.

In Figs. 10 and 11, pipe ends 40 and 41 are recessed as shown to cooperate with a contractable sealing ring 42 of the type previously described. The ends of the pipe are threaded to receive a threaded sleeve 43 which may be provided with an interior rib 44 adapted to center the sleeve with respect to the two sections of pipe. The parts are initially assembled as shown in Fig. 10 and then the pipe sections 40 and 41 are screwed up in the sleeve, thus contracting sealing ring 42 and forming a joint such as shown in Fig. 11. It will be noted that with this form of the invention, the lapping of the coacting sealing surfaces is accomplished by a combined rotary and longitudinal motion between the sealing surfaces on the pipe and the sealing surfaces on the sealing ring.

The wedging action which is exerted on the sealing ring as the joint is drawn up is one which has great mechanical advantage and hence large sealing pressures may be exerted with relatively small forces applied by the flange bolts or other means used to draw the joint together. The amount of mechanical advantage obtained depends, of course, upon the angle of the sloping surfaces. If a small angle be used (i. e. measured from the axis of the pipe) a large mechanical advantage is obtained, but the sealing ring must have a relatively long length and the ends of the pipe must be moved a relatively large distance in order to obtain a given contraction of the ring. On the other hand, if the angle of the sloping surface be large, the conditions are just reversed. An angle should be used which best suits the particular purpose, but I have found that for many purposes an angle of 16° is satisfactory as it is usually desirable that the sealing ring be relatively short measured axially of the pipe.

In practice, there is a maximum permissible pull which can be exerted by flange bolts or other means used to draw the parts together, and hence the ring should be so proportioned and dimensioned that it can be contracted by not more than the maximum permissable pull that can be exerted by the means used to draw the parts toward one another. The length of the tapered surfaces of the ring and the angle of the surfaces should be such as to take care of manufacturing variations in the size of the rings and the size of the pipe ends, i. e. to insure that the parts will readily start together and that complete drawing up of the pipe ends will effect sufficient contraction of the ring and adequate lapping of the sealing surfaces. Of course, the angle of the surfaces should not be so steep as to prevent pulling up of the pipe ends without damaging the sealing surface. On the other hand, it is desirable that the angle be steep enough to prevent the pipe ends from taking a seize fit upon the ring and thus making it difficult to break the joint for the purpose of cleaning the pipes or replacing a section of the pipe.

As the parts are assembled preparatory to drawing up the joint, the sealing ring is floating and acts to automatically align the pipe ends with each other and with the sealing ring. The contracting surfaces are so effectively lapped into a sealing fit that ordinary commercial machining methods are sufficiently accurate in making the parts, and the joint does not require great care in manufacture or in installation. In fact, in actual practice a fluid tight joint is obtained by the time a fraction of the lapping movement has been completed.

The exact dimensions and material of the sealing ring are not important, so long as they are such as to permit the ring to act as above described. In general, the material of the ring must have compressive strength and elasticity, and it is preferably made of ductile, malleable or worked metal similar to or somewhat softer than the parts to be joined. Thus, a steel ring is preferably used for steel pipe and a brass ring for brass pipe. For many purposes, stainless steel makes a good sealing ring. The material of the ring and its cross sectional proportions (i. e. axial length to cross axial thickness) are preferably such that the ring contracts as a unit when constricted as has previously been pointed out, but the exact proportions and dimensions of the ring may be varied considerably. The ring may have a thickness slightly less than the thickness of the pipe and a length slightly greater than twice its thickness.

The invention may assume forms other than those specifically disclosed and may be used for purposes other than those specifically disclosed. Accordingly, the present disclosure is merely illustrative in compliance with the patent statutes and is not to be considered as limiting.

Having described my invention, what I claim is:—

1. In combination with a tubular member which has an end with an enlarged bore, a resilient metal sealing ring having an external diameter greater than the minimum diameter of the internal surface of the enlarged bore, which surface is sloped to engage over the exterior of said ring, a substantially smooth bored abutment member closely surrounding the end of said tubular member, and means on said tubular member separate from said abutment member for so moving said tubular member relative to said ring as to wedge the end of the tubular member between the ring and the abutment member and thereby to form a sealed joint with said ring.

2. In combination with a tubular member which has an end with an enlarged bore, a resilient metal sealing ring having an external diameter greater than the minimum diameter of the internal surface of the enlarged bore, which surface is sloped to engage over the exterior of said ring, a substantially smooth bored abutment member closely surrounding the ends of said tubular member, and means on said tubular member separate from said abutment member for so moving said tubular member relative to said ring as to wedge the end of the tubular member between the ring and the abutment member and thereby to form sealed joints with each of them.

3. In combination with a tubular member which has an end with an enlarged bore, a resilient metal sealing ring having an external diameter greater than the minimum diameter of the internal surface of the enlarged bore, which surface is sloped to engage over the exterior of said ring, a substantially smooth bored abutment member closely surrounding the end of said tubular member, and means for so moving said tubular member relative to said ring as to cause said ring to decrease in diameter throughout its length and thereby to form a sealed joint with the tubular member.

4. In combination with a tubular member which has an end with an enlarged bore, a resilient member sealing ring having an external diameter greater than the minimum diameter of the internal surface of the enlarged bore, which surface is sloped to engage over the exterior of said ring, a substantially smooth bored abutment ring closely surrounding the end of said tubular member, and means separate from said rings for so moving said tubular member relative to said sealing ring as to cause the inner sealing ring to decrease in diameter throughout its length and thereby to form a sealed joint with the tubular member.

5. In combination with a tubular member, a resilient metal sealing ring having a longitudinally sloping external surface which normally fits within the end of said tubular member, a substantially smooth bored abutment member closely surrounding the end of said tubular member, and means on said tubular member separate from said abutment member for so moving said tubular member relative to said ring as to wedge the end of the tubular member between the ring and the abutment member and thereby to form sealed joints with each of them.

6. In combination with a tubular member, a resilient metal sealing ring having a longitudinally sloping external surface which normally fits within the end of said tubular member, a substantially smooth bored abutment member closely surrounding the end of said tubular member, and means for so moving said tubular member relative to said ring as to cause said ring to decrease in diameter throughout its length and thereby to form a sealed joint with the tubular member.

7. In combination with a tubular member, a resilient metal sealing ring having a longitudinally sloping external surface which normally fits within the end of said tubular member, a substantially smooth bored abutment ring closely surrounding the end of said tubular member, and means separate from said rings for so moving said tubular member relative to said sealing ring as to wedge the end of the tubular member between the rings and thereby to form sealed joints with each of them.

8. In combination with a tubular member which has an end with an enlarged bore, said end being provided with sealing portions, a ring of substantial thickness throughout its length fitting within the end of said tubular member and having a sealing portion, a second ring of substantial thickness throughout its length fitting around the outer end of said tubular member and having a sealing portion, at least one of said sealing portions being a sloping surface, and means separate from said rings for so moving said tubular member as to wedge the end thereof between said rings and thereby to form sealed joints with the rings.

9. In combination with a tubular member which has an end with an enlarged bore, said end being provided with a sealing portion, a ring of substantial thickness throughout its length fitting within the end of said tubular member, a second ring of substantial thickness throughout its length fitting around the outer end of said tubular member, at least one of said rings having a sealing portion, and means separate from said rings for so moving said tubular member as to wedge the end thereof between said rings and thereby to bring the sealing surfaces into cooperative relation.

10. In combination with a tubular member which has an end with an enlarged bore, said end being provided with a sealing portion, a solid ring of metal resistant to change of form and possessing ductility and of substantial thickness throughout its length, said ring fitting within the end of said tubular member and having a sealing portion, a second ring of substantial thickness throughout its length fitting around the outer end of said tubular member, at least one of said sealing portions being a sloping surface along which another sealing portion rides after contact and during movement of the tubular member relative to the inner ring, means for applying force to move said tubular member relative to said inner ring and to wedge and hold wedged the end of said tubular member between said rings, the distribution of the mass of the inner ring relative to the length thereof, the internal structure of said inner ring and the angularity of the sloping surface being such that the force applied is resolved into axial and cross-axial components, to which components the resistance to bending of each and every elemental cross-axial section of said inner ring is greater than the resistance to change of diameter of the inner ring substantially as a unit whereby the ring decreases in diameter substantially as a unit, making and maintaining a sealed joint between the contact portion thereof and a contact portion of the end of said tubular member.

11. In combination with a tubular member which has an end with an enlarged bore, a solid ring of metal of substantial thickness throughout its length and having its minimum internal diameter greater than the diameter of the bore of the tubular member, said ring fitting partially within the end of the tubular member, an abutment member around the periphery of the said end, and means for so moving said tubular member relative to the ring as to contract the ring until the bore thereof is in substantial alinement with the bore of the tubular member, thereby making a sealed joint between the ring and the end of said tubular member.

12. In combination with a tubular member which has an end with an enlarged bore, a solid ring of metal of substantial thickness throughout its length and having its minimum internal diameter greater than the diameter of the bore of the tubular member, and its external diameter not greater than the external diameter of the tubular member, said ring fitting partially within the end of the tubular member, an abutment member around the periphery of the said end, and means for so moving said tubular member relative to the ring as to contract the ring until the bore thereof is in substantial alinement with the bore of the tubular member, thereby making a sealed joint between the ring and the end of said tubular member.

In testimony whereof I affix my signature.

WYLIE G. WILSON.